United States Patent
German

(10) Patent No.: US 7,780,195 B2
(45) Date of Patent: Aug. 24, 2010

(54) PROTECTIVE COVERS FOR TRUCK CAB GUARDS

(76) Inventor: Mark K. German, 714 Braddock View Dr., Mt. Braddock, PA (US) 15465

( * ) Notice: Subject to any disclaimer, the term of this patent is extended or adjusted under 35 U.S.C. 154(b) by 139 days.

(21) Appl. No.: 11/846,287

(22) Filed: Aug. 28, 2007

(65) Prior Publication Data
US 2008/0048429 A1 Feb. 28, 2008

Related U.S. Application Data

(60) Provisional application No. 60/840,650, filed on Aug. 28, 2006.

(51) Int. Cl.
*B60J 11/00* (2006.01)
(52) U.S. Cl. ................... 280/770; 49/50; 49/57
(58) Field of Classification Search .............. 49/50, 49/57; 280/770
See application file for complete search history.

(56) References Cited

U.S. PATENT DOCUMENTS

| | | | |
|---|---|---|---|
| 4,592,583 A * | 6/1986 | Dresen et al. ............. | 296/39.2 |
| 4,611,824 A | 9/1986 | McIntosh | |
| 4,806,294 A * | 2/1989 | Lapierre et al. ............ | 264/54 |
| 4,867,497 A | 9/1989 | Jayne | |
| 4,973,099 A | 11/1990 | Deaver et al. | |
| 5,037,152 A | 8/1991 | Hendricks | |
| 5,236,764 A * | 8/1993 | Lenz et al. ................ | 428/158 |
| 5,238,280 A | 8/1993 | Christensen | |
| 6,012,753 A * | 1/2000 | Ordoyne et al. .......... | 296/24.31 |
| D467,862 S * | 12/2002 | Jenkins ..................... | D12/414 |
| 6,840,559 B2 * | 1/2005 | Burtin ...................... | 296/39.1 |
| 6,983,968 B2 | 1/2006 | Brauer et al. | |
| D528,964 S | 9/2006 | Storer et al. | |
| 7,121,585 B2 | 10/2006 | Cole | |
| 2004/0241388 A1* | 12/2004 | Ray, Jr. .................... | 428/122 |
| 2007/0176447 A1 | 8/2007 | Storer et al. | |

* cited by examiner

Primary Examiner—Paul N Dickson
Assistant Examiner—Erez Gurari
(74) Attorney, Agent, or Firm—Alan G. Towner, Esq.; Pietragallo Gordon Alfano Bosick & Raspanti, LLP

(57) ABSTRACT

Protective covers for cab guards or racks which extend vertically from the front rail of a truck bed behind the rear window of the truck cab are disclosed. The protective covers may be molded to fit any shape or size of truck bed rack. In one embodiment, the protective cover includes a generally horizontal top section which extends to two generally vertical side sections. Additional sections are typically provided between the side sections to provide a barrier that protects the rear window of the truck cab. When the protective cover is installed, it covers most of the surfaces of the truck bed rack, except the forward-facing surface of the rack located adjacent to the truck cab. Thus, the protective cover provides protection to essentially all exposed surfaces of the truck bed rack, while allowing easy installation.

21 Claims, 2 Drawing Sheets

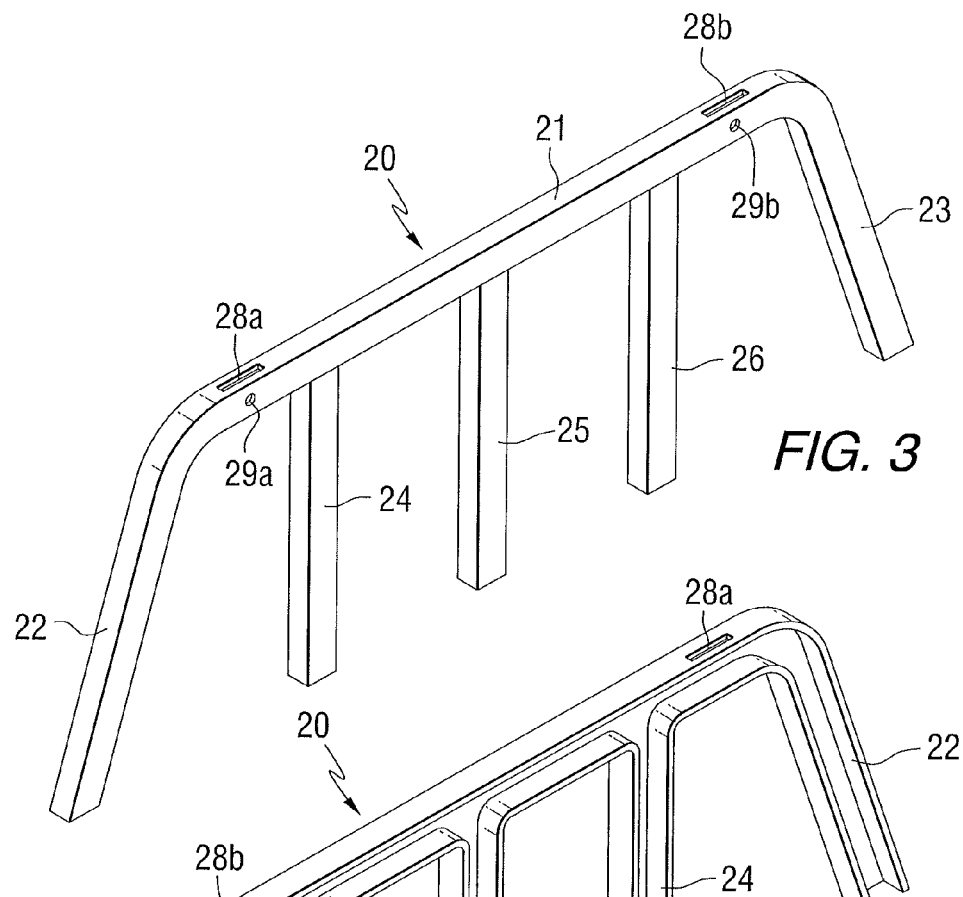
FIG. 3
FIG. 4
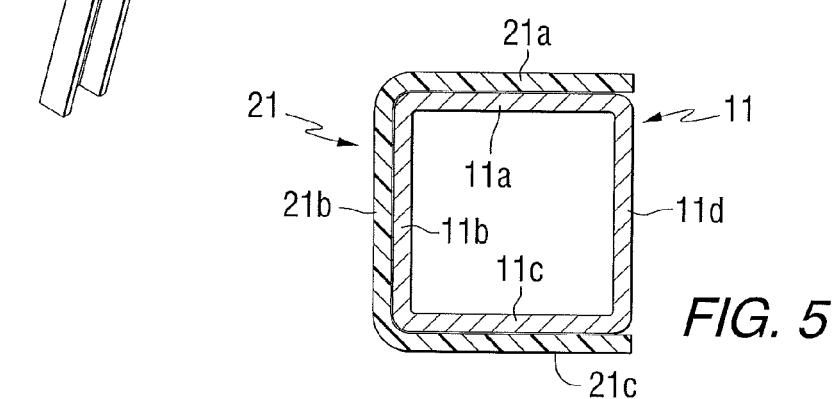
FIG. 5

PROTECTIVE COVERS FOR TRUCK CAB GUARDS

CROSS-REFERENCE TO RELATED APPLICATION

This application claims the benefit of U.S. Provisional Application No. 60/840,650 filed Aug. 28, 2006, which is incorporated herein by reference.

FIELD OF THE INVENTION

The present invention relates to protective covers for cab guards or racks installed on pickup truck beds.

BACKGROUND INFORMATION

Pickup trucks are often equipped with cab guards or racks which extend vertically from the front rail of the truck bed behind the rear window of the truck cab. Some examples of such cab guards, which are also known as headache racks, are shown in U.S. Pat. Nos. 4,867,497, 6,983,968 and 7,121,585. Such truck bed racks are usually made of metal and can provide additional support or tie down locations for items loaded in the truck bed, and can provide an additional barrier which protects the rear window of the cab. However, conventional metal racks can scratch or damage certain types of items loaded in the truck bed. Furthermore, the metal racks are susceptible to corrosion, particularly if the metal is exposed or scratched.

SUMMARY OF THE INVENTION

The present invention provides protective covers for racks which extend vertically from the front rail of a truck bed behind the rear window of the truck cab. Such truck bed racks may be installed on pickup truck beds, as well as other vehicles such as certain types of SUVs. The protective covers may be molded to fit any shape or size of truck bed rack. In one embodiment, the protective cover includes a generally horizontal top section which extends to two generally vertical side sections. Additional sections are typically provided between the side sections to provide a barrier that protects the rear window of the truck cab. For example, additional vertical sections may extend downward from the top horizontal section to the rail of the truck bed between the side sections. When the protective cover is installed, it covers most of the surfaces of the truck bed rack, except the forward-facing surface of the rack located adjacent to the truck cab. Thus, the protective cover provides protection to essentially all exposed surfaces of the truck bed rack, while allowing easy installation.

An aspect of the present invention is to provide a protective cover for a cab guard of a truck, the protective cover comprising a protective rearward facing side, and an open forward facing side structured and arranged to fit over the cab guard.

Another aspect of the present invention is to provide a cab guard assembly for a truck comprising a cab guard mounted adjacent to a front bed rail behind a cab of the truck, and a protective cover for the cab guard. The protective cover for the cab guard comprises a protective rearward facing side, and an open forward facing side which receives the cab guard.

A further aspect of the present invention is to provide a method of installing a protective cover on a truck cab guard comprising providing a protective cover including a protective rearward facing side and an open forward facing side, and pressing the open forward facing side onto the cab guard to thereby cover at least a rearward facing side of the cab guard while leaving a forward facing side of the cab guard exposed.

These and other aspects of the present invention will be more apparent from the following description.

BRIEF DESCRIPTION OF THE DRAWINGS

FIG. 3 is an isometric view showing the rearward-facing side of a protective cover in accordance with an embodiment of the present invention prior to installation on a truck bed rack.

FIG. 4 is an isometric view showing the open forward-facing side of the protective cover of FIG. 3.

FIG. 5 is a cross-sectional view taken through line 5-5 of FIG. 2, illustrating that the protective cover surrounds three sides of the truck bed rack but is open on the forward facing side of the rack.

DETAILED DESCRIPTION

Figure 1:
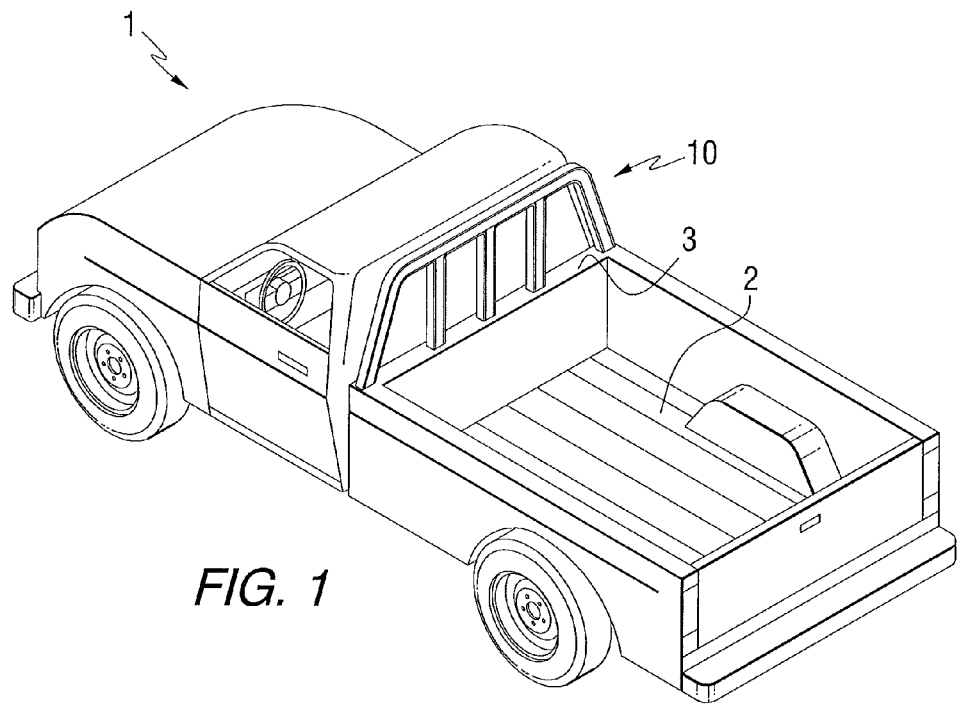
FIG. 1 is an isometric view of a pickup truck equipped with a bed rack having a protective cover in accordance with an embodiment of the present invention.

FIG. 1 illustrates a pickup truck equipped with a truck bed rack 10 with a protective cover in accordance with an embodiment of the present invention. As used herein, the term "truck bed rack" includes racks which extend vertically upward from the front rail of a pickup truck or other similar vehicle behind the cab of the truck. The truck 1 includes a truck bed 2, which may optionally be covered with a conventional truck bed liner. The truck bed 2 includes a front rail 3 upon which the covered truck bed rack 10 is mounted. The rack 10 may be mounted directly on the front rail 3 as shown in FIG. 3, or it may be mounted elsewhere, such as on the floor of the bed near the front wall of the bed. The covered truck bed rack 10 provides a barrier that protects the rear window of the truck cab, and which provides additional support and tie down locations for items loaded in the truck bed 2. The rack 10 is typically made of metal such as extruded steel or aluminum tubes or bars.

Figure 2:
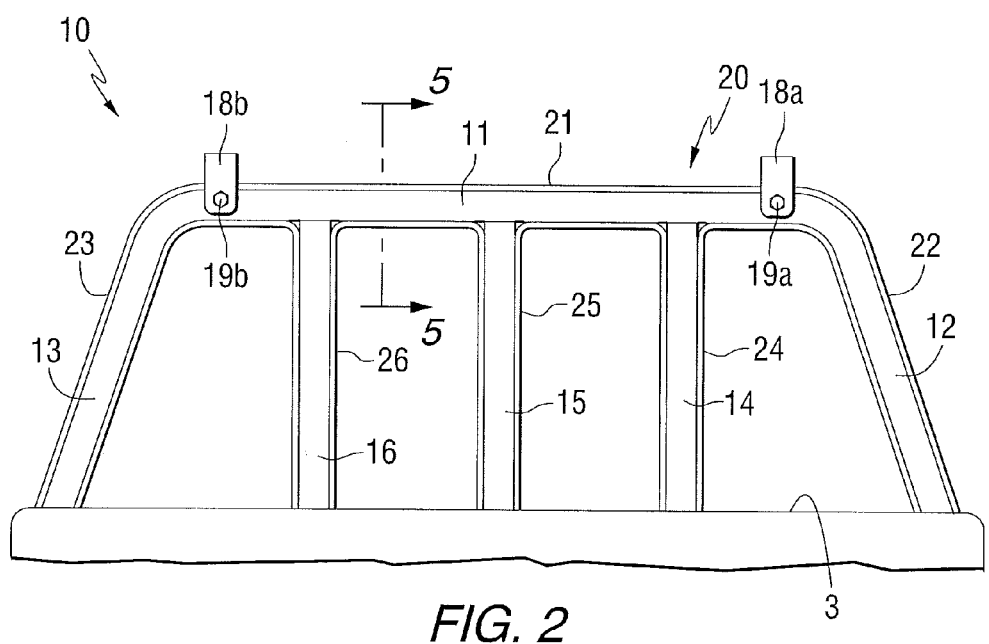
FIG. 2 is a front view of a pickup truck rack mounted on the front rail of a truck bed, including a protective cover in accordance with an embodiment of the present invention.

FIG. 2 is a front view showing the forward-facing side of the truck bed rack 10, i.e., the side of the truck bed rack 10 facing the cab of the truck 1. The rack 10 includes a generally horizontal top section 11 that extends to two generally vertical side sections 12 and 13, which are secured to the front rail 3 of the truck bed. In the embodiment shown in the figures, additional vertical sections 14, 15 and 16 extend downward from the top horizontal section 11 to the rail 3 between the vertical sides sections 12 and 13. The middle vertical sections 14, 15 and 16 provide an additional barrier for the rear of the truck cab. Although three middle vertical sections 14, 15 and 16 are illustrated in FIG. 2, any other desired number of vertical support members may be used. One or more horizontal sections may be used in addition to, or in place of, the middle vertical sections 14, 15 and 16 shown in the figures.

As shown in FIG. 2, the truck bed rack 10 has a protective cover 20 surrounding the rack, except for the forward-facing side of the rack. Isometric views showing the rearward-facing and forward-facing surfaces of the protective cover 20 are shown in FIGS. 3 and 4, respectively. The protective cover 20 includes a generally horizontal top section 21 which extends to two generally vertical side sections 22 and 23. The horizontal top section 21 and the vertical side sections 22 and 23 cover the horizontal section 11 and the vertical side sections 12 and 13 of the rack 10, respectively. In addition, the protective cover 20 includes three middle vertical sections 24, 25 and 26 which extend from the horizontal top section 21 to the front rail of the truck bed 3. The middle vertical sections 24, 25 and 26 cover the middle vertical sections 14, 15 and 16 of the rack 10, respectively.

As shown in FIGS. 3 and 4, the protective cover 20 may include features such as slots 28a and 28b, and holes 29a and 29b, which facilitate mounting of the protective cover 20 on the rack 10. As shown in FIG. 2, the rack 10 may include brackets 18a and 18b which are mounted on the rack 10 by means of tabs (not shown) which extend from the horizontal section 11 of the rack through the slots 28a and 28b of the protective cover 20. Bolts 19a and 19b, which extend through the horizontal section 11 of the rack 10 and through the holes 29a and 29b of the cover 20, are used to secure the brackets 18a and 18b on the rack 10, and to also secure the protective cover 20 on the rack 10.

FIG. 5 is a cross-sectional view of the horizontal top section 11 of the rack 10 taken through line 5-5 of FIG. 2. The horizontal section 11 of the rack 10 has an upward facing surface 11a, rearward facing surface 11b, downward facing surface 11c, and forward facing surface 11d. The horizontal top section 21 of the protective cover comprises an upper portion 21a, rear portion 21b and lower portion 21c. The horizontal section 21 of the cover thus covers the surfaces 11a, 11b and 11c of the horizontal rack section 11, but does not cover the forward-facing surface 11d of the rack. The generally vertical side sections 12 and 13, as well as the vertical middle sections 14, 15 and 16, of the protective cover similarly surround three sides of the corresponding sections of the rack 10, while leaving the forward-facing surface of the rack exposed. This arrangement allows the protective cover 20 to be easily mounted on the rack 10 by merely pressing the open side of the protective cover 20 against the rearward-facing side of the rack 10.

The protective covers of the present invention may be shaped to conform with various cab guard designs. Furthermore, although the various horizontal and vertical sections of the rack 10 shown in FIGS. 1-5 have generally square cross-sections, racks with other cross-sectional shapes may be covered with the protective cover of the present invention. For example, the rack sections may comprise rectangular, round or other cross-sectional shapes, and the protective cover may be formed accordingly.

The truck bed rack protective covers of the present invention may be used on pickup trucks equipped with standard truck bed liners. The lower ends of the vertical sections of the truck bed rack protective cover may contact, or come in close proximity to, the front upper rail of the truck bed liner. Although not required, the truck bed rack protective cover of the present invention and bed liner may be fastened together by any suitable means such as adhesives, mechanical fasteners, overlapped tabs and/or press fits. However, the provision of such connections between the truck bed rack protective cover and bed liner may not be necessary or desirable in many embodiments of the present invention.

The protective covers of the present invention may be made of any suitable material, such as those conventionally used in truck bed liners. For example, the protective cover may comprise injection molded plastic having a thickness of from about 0.05 to about 0.2 inch. The protective covers may be molded with any desired surface such as smooth or textured.

The truck bed rack protective covers may be made by any suitable method, such as conventional plastic thermoforming or plastic injection molding techniques. For example, an injection mold may be made based upon an actual or prototype truck bed rack upon which the protective cover is to be installed. The protective covers may be mounted on the truck bed racks by any suitable means such as adhesives and/or mechanical fasteners. However, in some embodiments, adhesives and mechanical fasteners may not be necessary, and the protective cover may simply be pressed or snap fit into place or held in place by the existing rack fasteners and bedliner. For example, the protective cover may be held in place by holes, slots, tabs or other similar features in the cover which engage or receive bars, tabs or other features that extend from the rack.

Whereas particular embodiments of this invention have been described above for purposes of illustration, it will be evident to those skilled in the art that numerous variations of the details of the present invention may be made without departing from the invention as defined in the appended claims.

The invention claimed is:

1. A protective cover for protecting a cab guard of a truck which is located outside a cab of the truck, the protective cover comprising:
    a protective rearward facing side; and
    an open forward facing side structured and arranged to fit over the cab guard to facilitate installation of the protective cover on the cab guard and removal of the protective cover from the cab guard;
    wherein the protective cover further comprises a generally horizontal upper section structured and arranged to cover a corresponding generally horizontal upper section of the cab guard and generally vertical side sections extending downward from ends of the generally horizontal upper section structured and arranged to cover corresponding generally vertical side sections of the cab guard; and
    wherein the generally horizontal upper section and each generally vertical side sections comprise a channel.

2. The protective cover of claim 1, wherein the generally horizontal upper section of the protective cover has an upper portion structured and arranged to cover an upward facing surface of the horizontal upper section of the cab guard, a rear portion structured and arranged to cover a rearward facing surface of the horizontal upper section of the cab guard, and a lower portion structured and arranged to cover a downward facing surface of the horizontal upper section of the cab guard.

3. The protective cover of claim 1, wherein each of the generally vertical side sections of the protective cover has opposing side portions connected by a rear portion.

4. The protective cover of claim 1, wherein the protective cover further comprises at least one generally vertical middle section extending downward from the generally horizontal upper section between the generally vertical side sections structured and arranged to cover at least one corresponding generally vertical middle section of the cab guard.

5. The protective cover of claim 4, wherein the at least one generally vertical middle section of the protective cover has opposing side portions connected by a rear portion.

6. The protective cover of claim 1, wherein the protective cover comprises at least one generally horizontal section and at least one generally vertical section connected to the at least one generally horizontal section.

7. The protective cover of claim 1, wherein the protective cover has a thickness of from about 0.05 to about 0.2 inch.

8. The protective cover of claim 1, wherein the protective cover comprises a plastic.

9. The protective cover of claim 8, wherein the plastic is injection molded.

10. The protective cover of claim 8, wherein the protective cover comprises a unitary piece of the plastic.

11. A cab guard assembly for a truck comprising:
a cab guard mounted adjacent to a front bed rail behind a cab of the truck; and
a protective cover for the cab guard comprising:
a protective rearward facing side facing away from the cab of the truck; and
an open forward facing side which receives the cab guard and which faces toward the cab of the truck to facilitate installation of the protective cover on the cab guard and removal of the protective cover from the cab guard;
wherein the protective cover further comprises a generally horizontal upper section structured and arranged to cover a corresponding generally horizontal upper section of the cab guard and generally vertical side sections extending downward from ends of the generally horizontal upper section structured and arranged to cover corresponding generally vertical side sections of the cab guard; and
wherein the generally horizontal upper section and each generally vertical side sections comprise a channel.

12. The cab guard assembly of claim 11, wherein the generally horizontal upper section of the protective cover has an upper portion which covers an upward facing surface of the horizontal upper section of the cab guard, a rear portion which covers a rearward facing surface of the horizontal upper section of the cab guard, and a lower portion which covers a downward facing surface of the horizontal upper section of the cab guard.

13. The cab guard assembly of claim 11, wherein each of the generally vertical side sections of the protective cover has opposing side portions connected by a rear portion.

14. The cab guard assembly of claim 11, wherein the protective cover further comprises at least one generally vertical middle section extending downward from the generally horizontal upper section between the generally vertical side sections which covers at least one corresponding generally vertical middle section of the cab guard.

15. The cab guard assembly of claim 14, wherein the at least one generally vertical middle section of the protective cover has opposing side portions connected by a rear portion.

16. The cab guard assembly of claim 11, wherein the protective cover comprises at least one generally horizontal section and at least one generally vertical section connected to the at least one generally horizontal section.

17. The cab guard assembly of claim 11, wherein the protective cover has a thickness of from about 0.05 to about 0.2 inch.

18. The cab guard assembly of claim 11, wherein the protective cover comprises a plastic.

19. The cab guard assembly of claim 18, wherein the plastic is injection molded.

20. The cab guard assembly of claim 18, wherein the protective cover comprises a unitary piece of the plastic.

21. A method of installing a protective cover on a truck cab guard of a truck for protecting the truck cab guard located outside a cab of the truck comprising:
providing a protective cover including a protective rearward facing side facing away from the truck and an open forward facing side facing toward the truck and further comprising a generally horizontal upper section structured and arranged to cover a corresponding generally horizontal upper section of the cab guard and generally vertical side sections extending downward from ends of the generally horizontal upper section structured and arranged to cover corresponding generally vertical side sections of the cab guard, and wherein the generally horizontal upper section and each generally vertical side sections comprise a channel which forms the open forward facing side of the protective cover; and
pressing the open forward facing side onto the cab guard to thereby cover at least a rearward facing side of the cab guard while leaving a forward facing side of the cab guard exposed.

\* \* \* \* \*